US010808836B2

(12) United States Patent
Okubo

(10) Patent No.: US 10,808,836 B2
(45) Date of Patent: Oct. 20, 2020

(54) MONITORING SYSTEM AND VEHICLE CONTROL DEVICE

(71) Applicant: HITACHI AUTOMOTIVE SYSTEMS, LTD., Ibaraki (JP)

(72) Inventor: Satoru Okubo, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 323 days.

(21) Appl. No.: 15/741,623

(22) PCT Filed: Aug. 2, 2016

(86) PCT No.: PCT/JP2016/072582
§ 371 (c)(1),
(2) Date: Jan. 3, 2018

(87) PCT Pub. No.: WO2017/056688
PCT Pub. Date: Apr. 6, 2017

(65) Prior Publication Data
US 2018/0202544 A1 Jul. 19, 2018

(30) Foreign Application Priority Data
Sep. 29, 2015 (JP) .................................. 2015-190626

(51) Int. Cl.
F16H 61/12 (2010.01)
G05B 9/03 (2006.01)
(Continued)

(52) U.S. Cl.
CPC .............. F16H 61/12 (2013.01); B60R 16/02 (2013.01); G05B 9/03 (2013.01); G06F 11/182 (2013.01);
(Continued)

(58) Field of Classification Search
CPC ............. F16H 61/12; F16H 2061/1208; G06F 11/182; G06F 11/187; B60R 16/02;
(Continued)

(56) References Cited

U.S. PATENT DOCUMENTS 4,386,427 A * 5/1983 Hosaka ................. F02D 41/266
701/114
4,918,606 A * 4/1990 Ito .......................... F16H 59/44
477/120

(Continued)

FOREIGN PATENT DOCUMENTS

DE 10243713 A1 4/2004
DE 10302456 A1 7/2004
(Continued)

OTHER PUBLICATIONS

Extended European Search Report dated May 16, 2019 for the European Patent Application No. 16850865.3.
(Continued)

Primary Examiner — Russell Frejd
(74) Attorney, Agent, or Firm — Volpe and Koenig, P.C.

(57) ABSTRACT

In a continuously variable transmission of an electric actuator system from which a hydraulic pressure generator such as an oil pump is excluded, it is necessary to cut off power supply to an actuator and turn a motor into an inoperative state similarly in a hydraulic actuator system in order to prevent unintended sudden acceleration or deceleration when a fail state is formed due to microcomputer failure of an electronic control device. As a result, a belt-slipping state occurs causing traveling failure. Thus, a master CPU (for control) and a slave CPU (for monitoring), which are configurations of an existing electronic control device are used. Both CPUs have monitoring functions configured to perform mutual monitoring. In addition, the existing electronic control device is also considered as a monitoring (Continued)

device via a network to provide a monitoring configuration among the three devices to accurately specify the failure part (CPU).

12 Claims, 4 Drawing Sheets

(51) Int. Cl.
   *B60R 16/02* (2006.01)
   *G06F 11/18* (2006.01)
   *G07C 5/08* (2006.01)
   *G05B 19/042* (2006.01)

(52) U.S. Cl.
   CPC .... *G07C 5/0808* (2013.01); *F16H 2061/1208* (2013.01); *G05B 19/0421* (2013.01); *G05B 19/0428* (2013.01); *G05B 2219/14014* (2013.01); *G05B 2219/14104* (2013.01); *G06F 11/187* (2013.01)

(58) Field of Classification Search
   CPC .... G07C 5/0808; G05B 9/03; G05B 19/0428; G05B 19/0421; G05B 2219/14104; G05B 2219/14014
   See application file for complete search history.

(56) References Cited

U.S. PATENT DOCUMENTS

| | | | | |
|---|---|---|---|---|
| 5,200,911 A * | 4/1993 | Ishikawa | ............ | B60G 17/0163 701/39 |
| 5,689,170 A * | 11/1997 | Ishikawa | ............... | B60L 3/0023 318/799 |
| 6,366,839 B1 | 4/2002 | Sato | | |
| 6,749,269 B1 | 6/2004 | Niwa | | |
| 7,610,521 B2 * | 10/2009 | Kuramochi | ........ | G05B 19/0428 714/22 |
| 8,224,541 B2 * | 7/2012 | Yoshioka | ............ | F16H 61/0206 477/125 |
| 8,498,772 B2 * | 7/2013 | Kanemoto | .......... | F02N 11/0825 701/29.1 |
| 9,346,486 B2 * | 5/2016 | Itamoto | ................ | B62D 5/0463 |
| 2004/0199824 A1 | 10/2004 | Harter | | |
| 2006/0116803 A1 | 6/2006 | Armbruster et al. | | |
| 2007/0076593 A1 | 4/2007 | Sakurai et al. | | |
| 2008/0006469 A1 * | 1/2008 | Sasaki | ................. | B62D 5/0481 180/428 |
| 2010/0082209 A1 * | 4/2010 | Yoshioka | ............ | F16H 61/0206 701/62 |
| 2017/0146118 A1 * | 5/2017 | Okubo | .................... | F16H 61/12 |

FOREIGN PATENT DOCUMENTS

| | | |
|---|---|---|
| JP | 60-151705 A | 8/1985 |
| JP | 07-293320 A | 11/1995 |
| JP | 2000-029734 A | 1/2000 |
| JP | 2000-225935 A | 8/2000 |
| JP | 2004-189163 A | 7/2004 |
| JP | 2007-126127 A | 5/2007 |
| JP | 2009-122831 A | 6/2009 |

OTHER PUBLICATIONS

Japanese Office Action dated Jun. 4, 2019 for the Japanese Patent Application No. 2017-542976.
International Search Report dated Nov. 15, 2016 for the International Application No. PCT/JP2016/072582.

* cited by examiner

FIG. 4

| | | MONITORING CU | SUB CPU | MAIN CPU |
|---|---|---|---|---|
| MONITORING RESULT | MAIN CPU | NEGATIVE | NEGATIVE | |
| | SUB CPU | 0 | | 1 |
| | MONITORING CU | | 0 | 1 |
| FAILURE PART | | NORMAL | NORMAL | ABNORMAL |

FIG. 5

| SIGNAL FROM FAILURE PART SPECIFYING MEANS | | | CONTROL SIGNAL TO BE USED | FAILURE PART | MONITORING MODE |
|---|---|---|---|---|---|
| 0 | 0 | 0 | MAIN CPU | NONE (NORMAL OPERATION) | MAIN CPU-SUB CPU |
| 0 | 0 | 1 | SUB CPU | MAIN CPU (NORMAL OPERATION) | SUB CPU – MONITORING CU |
| 0 | 1 | 0 | MAIN CPU | SUB CPU (NORMAL OPERATION) | MAIN CPU – MONITORING CU |
| 1 | 0 | 0 | MAIN CPU | MONITORING CU (NORMAL OPERATION) | MAIN CPU – SUB CPU |
| OTHER THAN ABOVE | | | NO OUTPUT | UNCLEAR | FAIL-SAFE STATE |

MONITORING SYSTEM AND VEHICLE CONTROL DEVICE

TECHNICAL FIELD

The present invention aims to prevent traveling failure caused by malfunction of an object to be controlled due to microcomputer failure of an electronic control device, and relates to a technique of a fail-safe system that can be applied to a system with a high safety requirement in which a normal operation as an electronic control device is required even when it is determined that a microcomputer is abnormal.

BACKGROUND ART

Regarding an electronic control device with a multi-CPU configuration, which uses two CPUs, as the current mainstream, when a second CPU becomes abnormal, this abnormality is detected in a first CPU and the second CPU is reset. Then, control that enables limp-home is executed based on a signal output from the first CPU. In addition, when an abnormality occurs in the first CPU, this abnormality is detected by a WDT monitoring circuit and the first CPU is reset, a process at abnormal time is performed in the second CPU, this abnormal time process that enables limp-home of injection control and ignition control that have been output from the first CPU is alternatively performed in the second CPU, and the control based on output from the second CPU instead of the output from the first CPU is executed (PTL 1).

CITATION LIST

Patent Literature

PTL 1: Japanese Patent Application Laid-Open No. H7-293320

SUMMARY OF INVENTION

Technical Problem

An abnormality detection means between the CPUs regarding the electronic control device with the multi-CPU configuration as illustrated in the above-described PTL 1 performed determination only using a watchdog pulse, that is, determines an abnormality only by a CPU function of calculating the watchdog pulse and does not perform diagnosis on the whole CPU function, so that it is hard to say that this abnormality detection means is an optimal countermeasure in terms of completeness of diagnosis.

Thus, an object of the present invention is to provide a monitoring system and a vehicle control device which are capable of detecting microcomputer failure in an electronic control device of a vehicle automatic transmission, which includes an electric actuator, and shifting to a fail-safe state with a small system configuration without greatly changing a current configuration of the electronic control device.

Solution to Problem

In order to achieve the above object, the present invention is characterized by including the following means.

A vehicle electronic control device including an electric actuator is provided which performs mutual monitoring among three parties of a control unit provided in a second vehicle control device, and a main control unit and a sub control unit of a first vehicle control device in a monitoring system that includes: the main control unit; the sub control unit that monitors the main control unit; the first vehicle control device including a failure part specifying means for specifying a failure part based on a monitoring result and a control signal switching means for switching a control signal based on a result of specifying the failure part; and the second vehicle control device configured separately from the first vehicle control device.

The sub control unit of the vehicle electronic control device including the electric actuator is provided which monitors the main control unit based on an operating signal output from the main control unit and transmits abnormality information to the failure part specifying means when detecting an abnormality of the main control unit.

The vehicle control device including the electric actuator and the second vehicle control device are connected via a communication means, for example, CAN communication or the like.

The monitoring system of the vehicle control device including the electric actuator is provided that is connected to the second vehicle control device via a communication means such as CAN communication, and the control unit provided in the second vehicle control device transmits a diagnosis signal to the main control unit or the sub control unit via the communication means and detects an abnormality of the main control unit or the sub control unit by confirming a reply from the main control unit or the sub control unit.

The monitoring system of the vehicle control device including the electric actuator is provided which uses the control unit provided in the second vehicle control device to monitor the main control unit or the sub control unit and transmits abnormality information to the failure part specifying means when detecting an abnormality.

The failure part specifying means of the vehicle control device including the electric actuator is provided which refers to monitoring results from the main control unit, the sub control unit, and the control unit provided in the second vehicle control device, specifies a failure part by a majority vote, and transmits a determination result thereof to the control signal switching means.

The control signal switching means of the vehicle control device including the electric actuator is provided which switches a control signal to be used to either a control signal output from the main control unit or a control signal output from the sub control unit based on the determination result from the failure part specifying means.

The control unit provided in the second vehicle control device is provided which monitors the main control unit or the sub control unit that controls an object to be controlled after detecting an abnormality when detecting the abnormality of the main control unit or the sub control unit.

The sub control unit of the vehicle control device including the electric actuator is provided which transmits an abnormality signal to the control unit provided in the second vehicle control device when an abnormality of the main control unit is detected, and the control unit monitors the sub control unit when receiving the abnormality signal.

The main control unit of the vehicle control device including the electric actuator is provided which monitors the sub control unit, one control unit between the main control unit and the sub control unit transmits an abnormality signal to the control unit provided in the second vehicle control device when detecting an abnormality of the other control unit, and the control unit monitors the one control unit when receiving the abnormality signal.

Advantageous Effects of Invention

According to claim 1 of the present invention, a master CPU (for control) and a slave CPU (for monitoring), which are general configurations of an existing electronic control device are used, both the CPUs are granted with monitoring functions to be configured to perform mutual monitoring. In addition, the other electronic control device is also considered as a monitoring device via a network to provide a monitoring configuration among the three parties so that it is possible to accurately specify the failure part (CPU).

Action and effects of the other claims of the present invention will be described in detail in the following embodiment.

BRIEF DESCRIPTION OF DRAWINGS

FIG. 4 is an example of a criterion for specifying a failure part based on a monitoring result of each monitoring device.

FIG. 5 is a method of switching a control signal performed by a control signal switching means using a determination result from a failure part specifying means.

DESCRIPTION OF EMBODIMENTS

Figure 1:
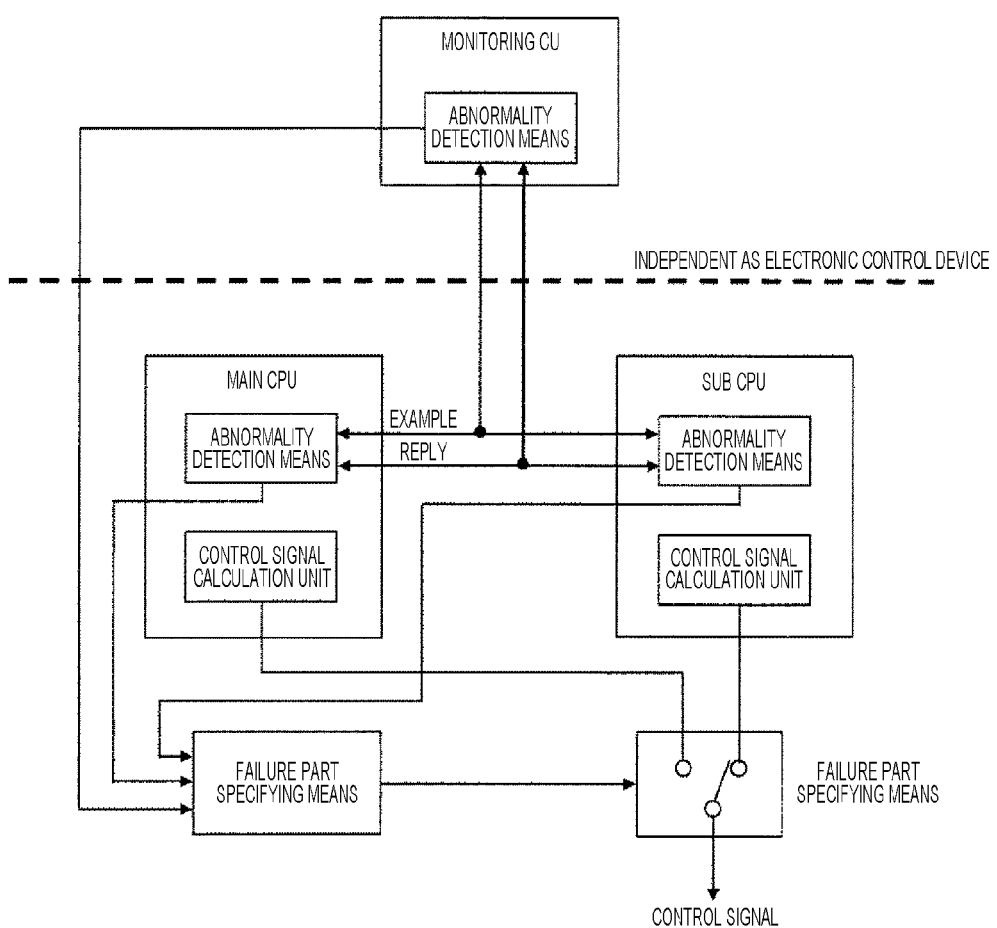
FIG. 1 is an example of a monitoring system in an ATCU illustrating an embodiment of the present invention.

Hereinafter, an embodiment of the present invention will be described with reference to the drawings.

First Embodiment

Most of transmissions control an actuator using hydraulic pressure to implement a transmission change operation.

However, the hydraulic pressure is poor in responsiveness and characteristics thereof remarkably change depending on environmental factors such as temperature. In addition, there is a necessity of mounting a hydraulic pressure generator (oil pump), which causes deterioration of cost, weight, and volume.

A case where a large number of electric devices per vehicle are installed is also considered along with acceleration of electrification of vehicle control devices. Drive power is supplied from a power supply such as a battery to these electronic control devices. There is no exception for the field of automatic transmissions, and there is a case where a linear solenoid is used as a hydraulic actuator, and it is conceivable to use an electric actuator using an electric motor for this part.

A continuously variable gear ratio transmission using the hydraulic actuator is provided with a normally-open linear solenoid that controls hydraulic pressure of the hydraulic actuator attached to each pulley. Further, it is configured such that the same hydraulic pressure is supplied to each hydraulic actuator in a failure state where it is difficult to supply current to the linear solenoid due to a microcomputer abnormality or the like of the electronic control device that controls the hydraulic actuator.

The pulley is designed such that a transmission gear ratio of the continuously variable transmission becomes constant when no current is supplied to the linear solenoid and the same hydraulic pressure is supplied to each hydraulic actuator. Thus, it is possible to make the vehicle travel at least even if the linear solenoid or a control valve fails so that it is difficult to control a hydraulic supply unit driven by supplying the hydraulic pressure.

In addition, in the field of electric power steering in which an electric actuator is applied to a steering system, there is a risk that a steering function malfunctions and this malfunction leads to a serious accident when failure occurs in an electronic control device including a microcomputer. That is, when the failure of the electronic control device occurs, the malfunction of the steering function is not allowed, and it is necessary to reliably execute normal processing instead of fail-safe processing. Thus, it is possible to reliably detect the failing electronic control device by providing a redundancy configuration of a triple or more system and always performing mutual monitoring in the electronic control device of electric power steering, and the steering function is secured by disconnecting the failing electronic control device from a monitoring loop.

In a continuously variable transmission of an electric actuator system from which the hydraulic pressure generator such as the oil pump is excluded, however, it is necessary to cut off power supply to an actuator and turn a motor into an inoperative state similarly in the hydraulic actuator system in order to prevent unintended sudden acceleration or deceleration when a fail state is formed due to microcomputer failure of an electronic control device. As a result, it is difficult to control a groove width of a pulley using the electric actuator, and thus, a force (torque) for pressing a V-belt is not generated, that is, a belt-slipping state occurs, thereby causing traveling failure.

In addition, when the mutual monitoring configuration is adopted in which the electronic control device has the redundant configuration of the triple or more system, the mounting area of the electronic control device is three times the typical mounting area, which inevitably causes a problem in recent vehicles on which a large number of electronic control components are mounted. In addition, the redundancy of the electronic control device also becomes a means relating to a device that is likely to be led to a serious accident if malfunction occurs, such as an electric steering device, similarly in terms of cost. In the field of transmissions, however, it is difficult to say that such a means is an optimal countermeasure in consideration of cost effectiveness since there is no possibility of leading to a serious accident even if the function of the electronic control device malfunctions.

Thus, a description will be given in the following embodiment of the present invention regarding a monitoring system that is capable of reliably detecting microcomputer failure in an electronic control device of a vehicle automatic transmission (particularly an automatic continuously variable transmission) including an electric actuator and reliably shifting to a fail-safe state with a minimum system configuration without greatly changing a configuration of a current electronic control device.

FIG. 1 illustrates an example of a monitoring system in an electronic control device (hereinafter referred to as an ATCU) according to claim 1 targeting the automatic continuously variable transmission including the electric actuator.

The ATCU is composed of two CPUs including a main CPU that controls the electric actuator and a sub CPU that monitors an operating function of the main CPU. There is a rotation pulse signal generated along with rotation of a primary pulley and a secondary pulley as input to the ATCU, and there are a target engine speed and a target engine torque necessary for calculation of a target gear ratio, and motor position information from the electric actuator that controls a gear ratio as other information input via a network such as CAN communication. Based on these pieces of information, the main CPU determines a transmission gear ratio, that is, a control amount of the electric actuator by calculating a target drive torque. It is necessary to convert the calculated control amount into a signal for driving the electric actuator, that is, an electric motor, and a control signal after subjected to environmental disturbance correction of a motor power supply voltage, temperature, and the like is output to the driver circuit in the main CPU such that the electric actuator is controlled.

It is necessary for the main CPU performing the control as described above to monitor whether or not each function properly operates. Thus, the sub CPU transmits a plurality of problems for monitoring a function to the main CPU. The main CPU calculates a reply corresponding to the problem using all operators defined in the CPU with respect to the received problem, and sends the reply to the sub CPU. The sub CPU stores a reply value that is hardly calculated unless the function (operator) that needs to be originally expected is normal, and determines whether or not the main CPU normally operates by collating this value with reply data received from the main CPU.

It is necessary to guarantee the soundness for the sub CPU on the monitoring side as well while the sub CPU monitors the main CPU. Thus, it is configured such that the mutual monitoring is performed between the main CPU and the sub CPU by mounting a monitoring logic mounted in the sub CPU even to the main CPU.

A monitoring electronic control device (hereinafter referred to as a monitoring CU) is configured separately from the ATCU, and is connected to the ATCU via a communication line. The monitoring CU monitors whether or not the main CPU and the sub CPU of the ATCU normally operate. The same configuration as the mutual monitoring between the main CPU and the sub CPU is provided as a monitoring method, and the monitoring is performed between the main CPU and the monitoring CU and between the sub CPU and the monitoring CU.

As described above, it is configured such that the mutual monitoring is performed among the three parties of the main CPU, the sub CPU, and the monitoring CU, and it is possible to specify a failure part.

Thereafter, monitoring results are integrated in the failure part specifying means, and the failure part is specified. First, the monitoring results of the main CPU and sub CPU are collated. At this time, when both the CPUs do not detect any abnormality, it is determined that the ATCU is normal, and the system shifts to normal control and outputs the control signal. On the other hand, when the monitoring results of the main CPU and the sub CPU are different from each other, that is, when any one of the CPUs has transmitted the monitoring result that it is determined to be abnormal to the failure part specifying means, the CPU that made the same determination as a monitoring result in the monitoring CU is normalized with reference to the monitoring result of the monitoring CU. On the other hand, when the monitoring result in the monitoring CU is abnormality even though the monitoring results of both the main CPU and the sub CPU are normality among the monitoring results transmitted to the failure part specifying means, there is a possibility that the monitoring CU has failed, and thus, the main CPU and the sub CPU exclude the monitoring CU from a mutual monitoring target.

The failure part specifying means instructs the control signal switching means to switch the control signal based on the monitoring results received from the main CPU, the sub CPU, and the monitoring CU. To be specific, when it is assumed that the main CPU is normal in an initial state, the main CPU calculates the control amount for the electric actuator and outputs the control signal. At this time, the sub CPU and the monitoring CU monitor the function of the main CPU and confirm that there is no abnormality. When it is determined that the main CPU is abnormal by the sub CPU and the monitoring CU, the failure part specifying means causes the control signal switching means to switch the control switch such that the control signal is output from the sub CPU. At this time, the sub CPU takes charge of the main function, and the monitoring CU monitors the sub CPU.

With the above configuration, the monitoring CU can monitor the sub CPU even if the main CPU fails as well as the failure part can be suitably specified, and thus, there is no need to particularly perform the shift to fail-safe processing, and it is possible to implement normal control with the sub CPU. As a result, the reliability of the system is dramatically improved, it is possible to apply the present invention to a system with a high safety requirement with the simple configuration, and to provide the present invention with a minimum increase in cost.

In addition, when the two CPUs mounted on the electronic control device have the same functions regarding the control function and the mutual monitoring function, it is possible to execute normal control with the normal CPU by switching a control CPU using a control switching means even if one of the CPUs becomes abnormal.

Therefore, for example, in the automatic continuously variable transmission whose transmission is controlled by the electric actuator, there is no method of fail-safe processing other than a method in which the monitoring CPU cuts off the power supply of the electric actuator from the viewpoint of securing the safety when the control CPU is abnormal in the configuration of the existing electronic control device in which the monitoring CPU monitors the control CPU within the same electronic control device. According to the configuration of the present embodiment, however, it is possible to execute the normal control by performing switching to the normal control CPU using the control switching means in addition to the accurate specifying of the failure part (CPU) through the monitoring configuration among the three parties including the monitoring from the other electronic control device.

As a result, it is difficult to fix the transmission gear ratio as in the hydraulic actuator type automatic continuously variable transmission and the traveling failure occurs by executing the fail-safe processing of cutting off the power supply to the electric actuator due to the CPU abnormality in the monitoring configuration of the existing electronic control device. In the present invention, however, the safety is guaranteed by the mutual monitoring between another normal CPU and the other electronic control device even if any one of the CPUs in the electronic control device becomes abnormal, and thus, it is possible to reliably operate the electric actuator by fail-safe control, and even by normal control so that the present invention can be applied to the system with the high safety requirement.

In addition, a technique of multiplexing the electronic control device is inevitably adopted in the system with the high safety requirement. In the present embodiment, however, there is no need of multiplexing and it is only necessary to improve the performance to the control CPU from the conventional monitoring CPU and incorporate the monitoring function to the other electronic control device so that it is possible to expect an effect in reduction of system cost.

Second Embodiment

Figure 2:
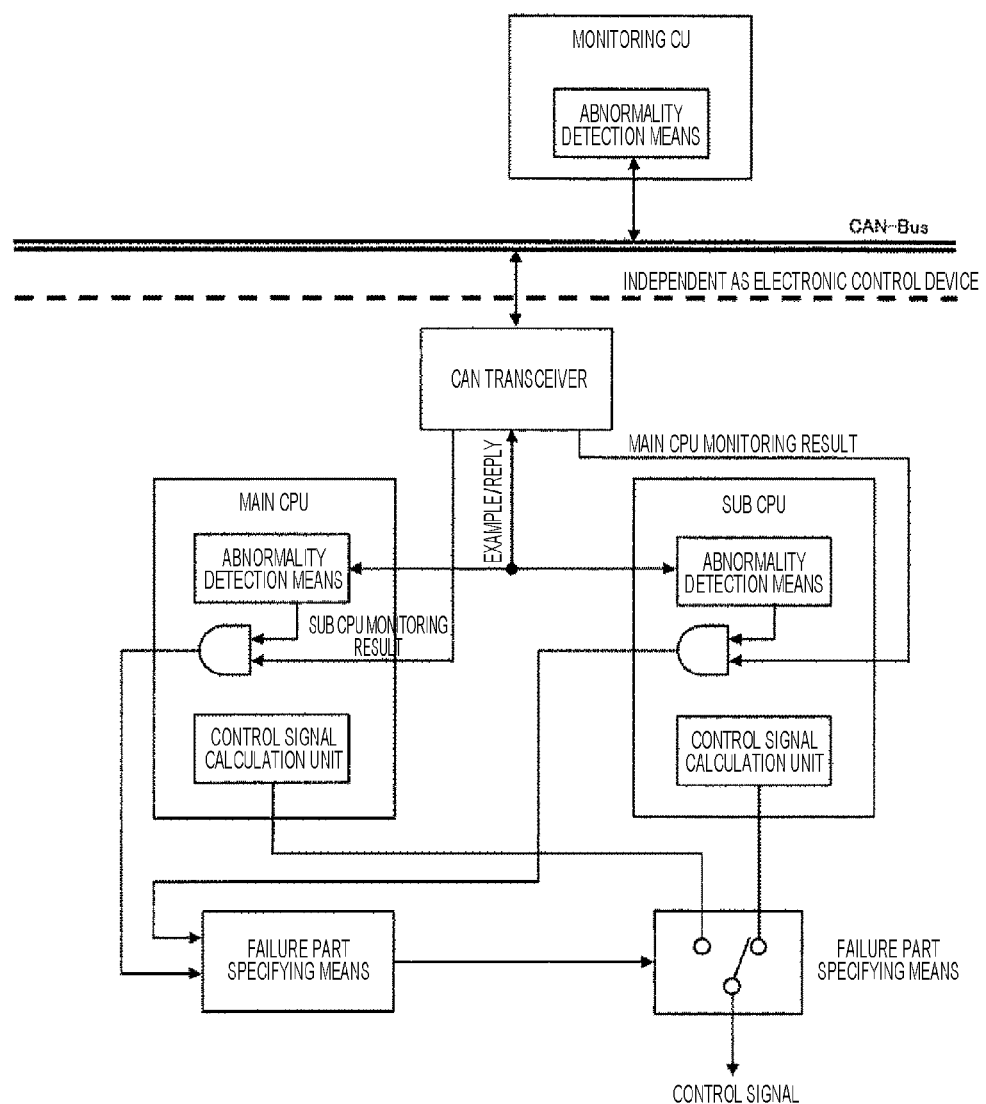
FIG. 2 is an example of a monitoring system in the ATCU illustrating the embodiment of the present invention that represents electronic control devices via a network such as CAN communication.

FIG. 2 illustrates a system configuration when an ATCU and a monitoring CU are connected via network communication such as CAN. A difference from the configuration of FIG. 1 is that the ATCU and the monitoring CU are connected via the network such as CAN communication.

The ATCU is composed of two CPUs including a main CPU that controls the electric actuator and a sub CPU that monitors an operating function of the main CPU. There is a rotation pulse signal generated along with rotation of a primary pulley and a secondary pulley as input to the ATCU, and there are a target engine speed and a target engine torque necessary for calculation of a target gear ratio, and motor position information from the electric actuator that controls a gear ratio as other information input via a network such as CAN communication. Based on these pieces of information, the main CPU determines a transmission gear ratio, that is, a control amount of the electric actuator by calculating a target drive torque. It is necessary to convert the calculated control amount into a signal for driving the electric actuator, that is, an electric motor, and a control signal after subjected to environmental disturbance correction of a motor power supply voltage, temperature, and the like is output to the driver circuit in the main CPU such that the electric actuator is controlled.

It is necessary for the main CPU performing the control as described above to monitor whether or not each function properly operates. Thus, the sub CPU transmits a plurality of problems for monitoring a function to the main CPU. The main CPU calculates a reply corresponding to the problem using all operators defined in the CPU with respect to the received problem, and sends the reply to the sub CPU. The sub CPU stores a reply value that is hardly calculated unless the function (operator) that needs to be originally expected is normal, and determines whether or not the main CPU normally operates by collating this value with reply data received from the main CPU.

It is necessary to guarantee the soundness for the sub CPU on the monitoring side as well while the sub CPU monitors the main CPU. Thus, it is configured such that the mutual monitoring is performed between the main CPU and the sub CPU by mounting a monitoring logic mounted in the sub CPU even to the main CPU.

A monitoring electronic control device (hereinafter referred to as the monitoring CU) is configured separately from the ATCU, and is connected to the ATCU via the network such as CAN communication. The monitoring CU monitors whether or not the main CPU and the sub CPU of the ATCU normally operate. The same configuration as the mutual monitoring between the main CPU and the sub CPU is provided as a monitoring method, and the monitoring is performed between the main CPU and the monitoring CU and between the sub CPU and the monitoring CU.

As described above, it is configured such that the mutual monitoring is performed among the three parties of the main CPU, the sub CPU, and the monitoring CU, and it is possible to specify a failure part.

First, the monitoring results of the main CPU and sub CPU are collated. At this time, when both the CPUs do not detect any abnormality, it is determined that the ATCU is normal, and the system shifts to normal control and outputs the control signal. On the other hand, when the monitoring results of the main CPU and the sub CPU are different from each other, that is, when it is determined that any one of the CPUs is abnormal, the relevant CPU receives the monitoring result of the monitoring CU, compares its own monitoring result with the monitoring result of the monitoring CU, and transmits a result of the comparison to the failure part specifying means. On the other hand, when the monitoring result of the monitoring CU is the abnormality despite a fact that the monitoring results of both the main CPU and the sub CPU are normality, the abnormality information is transmitted to both the main CPU and the sub CPU, and thus, it is determined that there is a possibility that the monitoring CU has failed, and the main CPU and the sub CPU exclude the monitoring CU from the mutual monitoring target.

The failure part specifying means instructs the control signal switching means to switch the control signal based on the monitoring results received from the main CPU and the sub CPU. To be specific, when it is assumed that the main CPU is normal in an initial state, the main CPU calculates the control amount for the electric actuator and outputs the control signal. At this time, the sub CPU and the monitoring CU monitor the function of the main CPU and confirm that there is no abnormality. When it is determined that the main CPU is abnormal by the sub CPU and the monitoring CU, the failure part specifying means causes the control signal switching means to switch the control switch such that the control signal is output from the sub CPU. At this time, the sub CPU takes charge of the main function, and the monitoring CU monitors the sub CPU.

With the above configuration, the monitoring CU can monitor the sub CPU even if the main CPU fails as well as the failure part can be suitably specified, and thus, there is no need to particularly perform the shift to fail-safe processing, and it is possible to implement normal control with the sub CPU. As a result, the reliability of the system is dramatically improved, it is possible to apply the present invention to a system with a high safety requirement with the simple configuration, and to provide the present invention with a minimum increase in cost.

Third Embodiment

Figure 3:
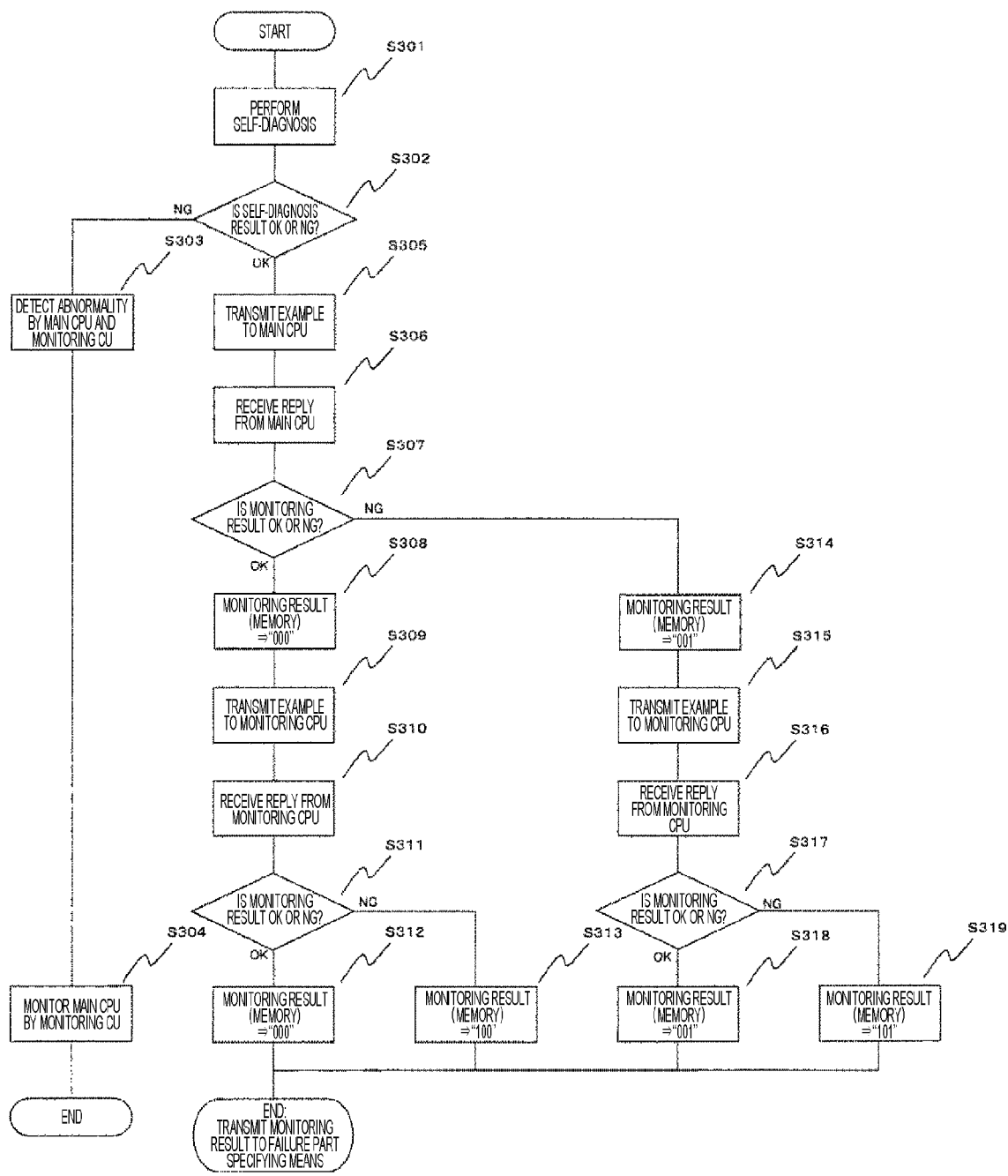
FIG. 3 is a flowchart illustrating a monitoring procedure in a sub CPU at the time of initial activation, which is an operation of the monitoring system according to the present invention.

FIG. 3 illustrates a specific example of a monitoring procedure immediately after activation of the ATCU.

Immediately after the ATCU is activated, each CPU performs self-diagnosis for the purpose of confirming the soundness of the own CPU before shifting to normal control (S301). Here, specific examples of the self-diagnosis include memory diagnosis (ROM/RAM diagnosis), register diagnosis, and the like.

When the self-diagnosis of the sub-CPU results in the abnormality (S302), the reliability with respect to the monitoring of the other CPU disappears, and thus, the monitoring of the main CPU needs not be performed. At this time, the main CPU and the monitoring CU can detect an abnormality based on a self-diagnosis result from the sub CPU or a function monitoring result (S303). Thereafter, the sub CPU is excluded from a monitoring form, and a form of monitoring the main CPU using the monitoring CU is adopted (S304).

When the self-diagnosis result of the sub CPU is normal, the sub CPU transmits a signal (hereinafter, an example) for function monitoring to the main CPU (S305). The main CPU executes an example operating program, mounted in advance, with respect to the example received from the sub CPU, and reply data is sent to the sub CPU (S306). The sub CPU determines whether or not an operational function of the main CPU is normal based on a reply result from the main CPU (S307).

When it is determined that the main CPU is normal, the sub CPU stores this monitoring result in its own control memory (S308). In the present embodiment, the monitoring result is represented by a three-digit numerical value such that a numerical value of the first digit is the monitoring result of the main CPU, the second digit is the monitoring result of the sub CPU, and the third digit is the monitoring result of the monitoring CU. The common arrangement is adopted by the three monitoring mechanisms, and "0" indicates the normality and "1" indicates the abnormality. Accordingly, since the main CPU is normal in S308, a numerical value of the first digit becomes "0", and "000" is obtained when the result is displayed in three digits.

Next, since it is necessary to monitor the functions of the monitoring CU from the viewpoint of the mutual monitoring among the three parties, an example is transmitted to the monitoring CU (S309). The monitoring CU executes an example operating program, mounted in advance, with respect to the example received from the sub CPU, and reply data is sent to the sub CPU (S310). The sub CPU determines whether or not an operational function of the monitoring CU is normal based on a reply result from the monitoring CU (S311). When it is determined that the monitoring CU is normal, the sub CPU stores this monitoring result in its own control memory (S312). In the present embodiment, the monitoring result of the monitoring CU is indicated in the third digit, and thus, "000" is obtained when the result is displayed in three digits since the main CPU is normal and the monitoring CU is normal.

On the other hand, when it is determined in S311 that the monitoring CU is abnormal, the sub CPU stores this monitoring result in its own control memory (S313). In the present embodiment, the monitoring result of the monitoring CU is indicated in the third digit, and thus, "100" is obtained when the result is displayed in three digits since the main CPU is normal and the monitoring CU is abnormal.

On the other hand, when it is determined in S307 that the main CPU is abnormal, the sub CPU stores this monitoring result in its own control memory (S314). In the present embodiment, the monitoring result of the main CPU is indicated in the third digit, and thus, "001" is obtained when the result is displayed in three digits since the main CPU is abnormal.

Next, since it is necessary to monitor the functions of the monitoring CU from the viewpoint of the mutual monitoring among the three parties, an example is transmitted to the monitoring CU (S315). The monitoring CU executes an example operating program, mounted in advance, with respect to the example received from the sub CPU, and reply data is sent to the sub CPU (S316). The sub CPU determines whether or not an operational function of the monitoring CU is normal based on a reply result from the monitoring CU (S317). When it is determined that the monitoring CU is normal, the sub CPU stores this monitoring result in its own control memory (S318). In the present embodiment, the monitoring result of the monitoring CU is indicated in the third digit, and thus, "001" is obtained when the result is displayed in three digits since the main CPU is abnormal and the monitoring CU is normal.

On the other hand, when it is determined in S317 that the monitoring CU is abnormal, the sub CPU stores this monitoring result in its own control memory (S319). In the present embodiment, the monitoring result of the monitoring CU is indicated in the third digit, and thus, "101" is obtained when the result is displayed in three digits since the main CPU is abnormal and the monitoring CU is abnormal.

Through the above processing, the sub CPU can perform the function monitoring for the main CPU and the monitoring CU, and the mutual monitoring among the three parties is possible for the first time as the main CPU and the monitoring CU perform the same processing. When the main CPU, the sub CPU, and the monitoring CU transmit the respective monitoring results to the failure part specifying means and each digit of the monitoring results expressed in three digits is integrated by logical AND, any signal illustrated in FIG. 5 is obtained. Thus, it is possible not only to specify the failure part but also to switch the control signal to be output to the electric actuator. As a result, even if either the main CPU or the sub CPU fails, it is possible to normally perform the control with the remaining CPU, and the reliability of the system is dramatically improved. Thus, it is possible to apply the present invention even in the system with the high safety requirement with the simple configuration.

Although the configuration of the present invention has been described as above, the present invention is not limited to the monitoring system of the ATCU, and can be applied to a system which does not work in a safe direction as a vehicle at low coast by stopping the operation of the electronic control device.

INDUSTRIAL APPLICABILITY

According to the present invention, even when it is difficult to mount a plurality of monitoring devices due to restrictions of hardware such as the mounting area of the electronic control device, it is possible to cause the other electronic control device to serve as a monitoring device if there is any kind of communication means, and it is possible to apply the present invention to the system which does not work in the safe direction as the vehicle at low coast by stopping the operation of the electronic control device.

REFERENCE SIGNS LIST

S301 sub CPU self-diagnosis process at initial activation
S302 determination of self-diagnosis result of sub CPU
S303 sub CPU abnormality detection processing by main CPU and monitoring CU
S304 process of switching monitoring of main CPU from sub CPU to monitoring CU
S305 process of transmitting example to main CPU
S306 process of receiving reply from main CPU
S307 determination of function monitoring result of main CPU
S308 storage process at time of determining normality of function of main CPU
S309 process of transmitting example to monitoring CU
S310 process of receiving reply from monitoring CU
S311 determination of function monitoring result of monitoring CU
S312 storage process at time of determining normality of function of monitoring CU
S313 storage process at time of determining abnormality of function of monitoring CU
S314 storage process at time of determining abnormality of function of main CPU
S315 process of transmitting example to monitoring CU
S316 process of receiving reply from monitoring CU S317 determination of function monitoring result of monitoring CU
S318 storage process at time of determining normality of function of monitoring CU
S319 storage process at time of determining abnormality of function of monitoring CU

The invention claimed is:

1. A monitoring system comprising:
a main control unit;
a sub control unit that monitors the main control unit;
a first vehicle control device which includes a failure part specifying means for specifying a failure part based on a monitoring result and a control signal switching means for switching a control signal based on a result of specifying the failure part;
a second vehicle control device that is configured separately from the first vehicle control device;
wherein mutual monitoring is performed among a control unit provided in the second vehicle control device, and the main control unit and the sub control unit of the first vehicle control device; and,
wherein the control unit provided in the second vehicle control device monitors the main control unit or the sub control unit and transmits abnormality information to the failure part specifying means when detecting an abnormality.

2. The monitoring system according to claim 1, wherein the failure part specifying means refers to monitoring results from the main control unit, the sub control unit, and the control unit provided in the second vehicle control device, specifies a failure part by a majority vote, and transmits a determination result thereof to the control signal switching means.

3. The monitoring system according to claim 1, wherein the control signal switching means switches a control signal to be used to either a control signal output from the main control unit or a control signal output from the sub control unit based on the determination result from the failure part specifying means.

4. The monitoring system according to claim 1, wherein when an abnormality of the main control unit or the sub control unit is detected, the control unit provided in the second vehicle control device monitors the main control unit or the sub control unit that performs control on an object to be controlled after the detection.

5. The monitoring system according to claim 1, wherein when an abnormality of the main control unit is detected, the sub control unit transmits an abnormality signal to the control unit provided in the second vehicle control device, and the control unit monitors the sub control unit when receiving the abnormality signal.

6. The monitoring system according to claim 1, wherein the main control unit monitors the sub control unit,
when one control unit between the main control unit and the sub control unit transmits an abnormality signal to the control unit provided in the second vehicle control device when detecting an abnormality of the other control unit, and the control unit monitors the one control unit when receiving the abnormality signal.

7. A vehicle control device comprising:
a main control unit;
a sub control unit that monitors the main control unit;
a failure part specifying means for specifying a failure part based on a monitoring result;
a control signal switching means for switching a control signal based on a result of specifying a failure part;
wherein mutual monitoring is performed among a control unit provided in a control device configured separately from the vehicle control device, the main control unit, and the sub control unit; and,
wherein the control unit provided in the control device, configured separately from the vehicle control device, monitors the main control unit or the sub control unit and transmits abnormality information to the failure part specifying means when detecting an abnormality.

8. The vehicle control device according to claim 7, wherein
the failure part specifying means refers to monitoring results from the main control unit, the sub control unit, and the control unit provided in the control device, configured separately from the vehicle control device, specifies a failure part by a majority vote, and transmits a determination result thereof to the control signal switching means.

9. The vehicle control device according to claim 7, wherein
the control signal switching means switches a control signal to be used to either a control signal output from the main control unit or a control signal output from the sub control unit based on the determination result from the failure part specifying means.

10. The vehicle control device according to claim 7, wherein
when an abnormality of the main control unit or the sub control unit is detected, the control unit provided in the control device monitors the main control unit or the sub control unit that performs control on an object to be controlled after the detection.

11. The vehicle control device according to claim 7, wherein
when an abnormality of the main control unit is detected, the sub control unit transmits an abnormality signal to the control unit provided in the control device, and the control unit monitors the sub control unit when receiving the abnormality signal.

12. The vehicle control device according to claim 7, wherein
the main control unit monitors the sub control unit,
when one control unit between the main control unit and the sub control unit transmits an abnormality signal to the control unit provided in the control device when detecting an abnormality of the other control unit, and the control unit monitors the one control unit when receiving the abnormality signal.

* * * * *